Jan. 21, 1936.  C. D. SMITH  2,028,707
WHEEL FOR RAIL CARS
Filed April 25, 1932  2 Sheets-Sheet 1
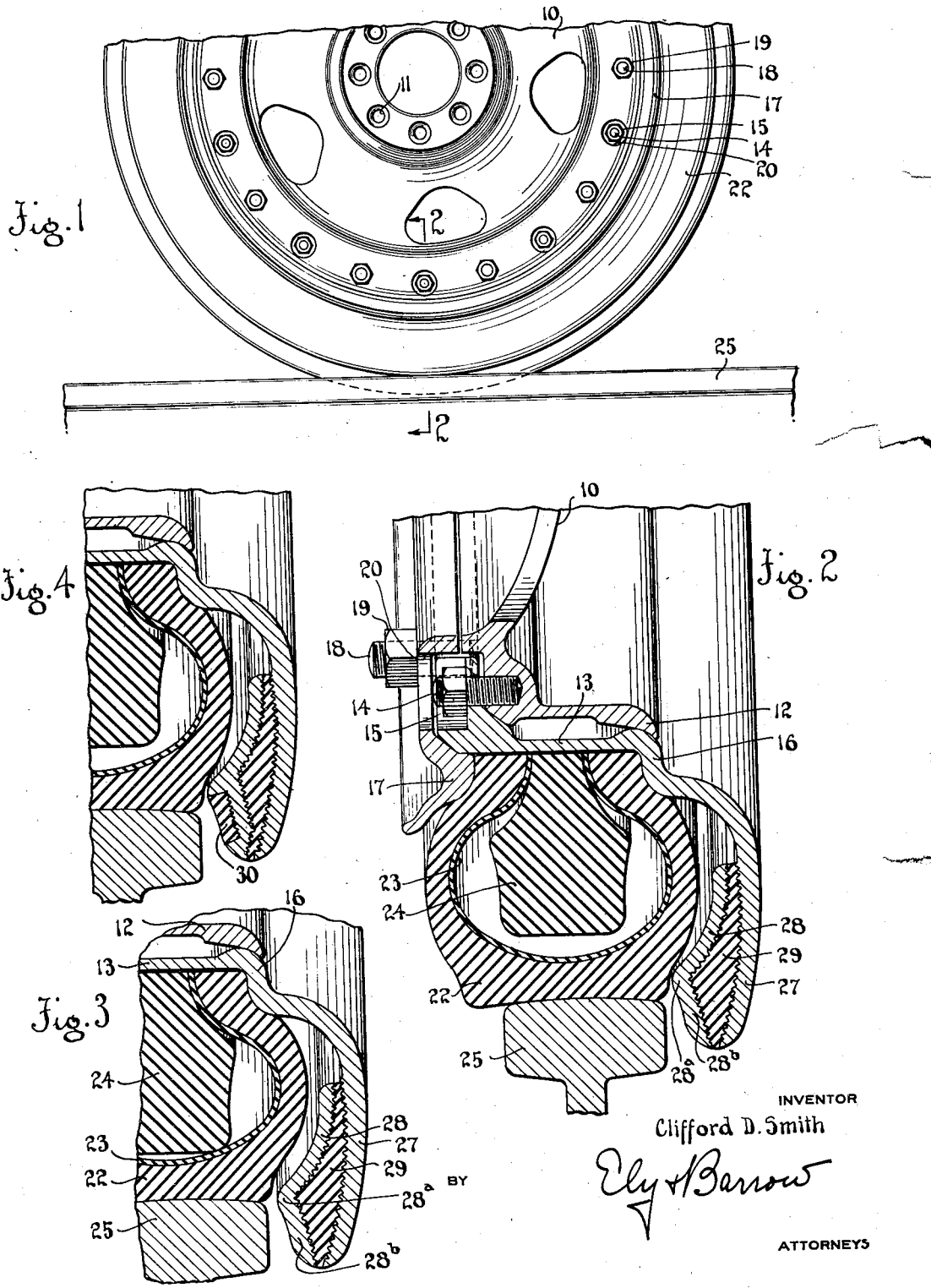
INVENTOR
Clifford D. Smith
BY
ATTORNEYS

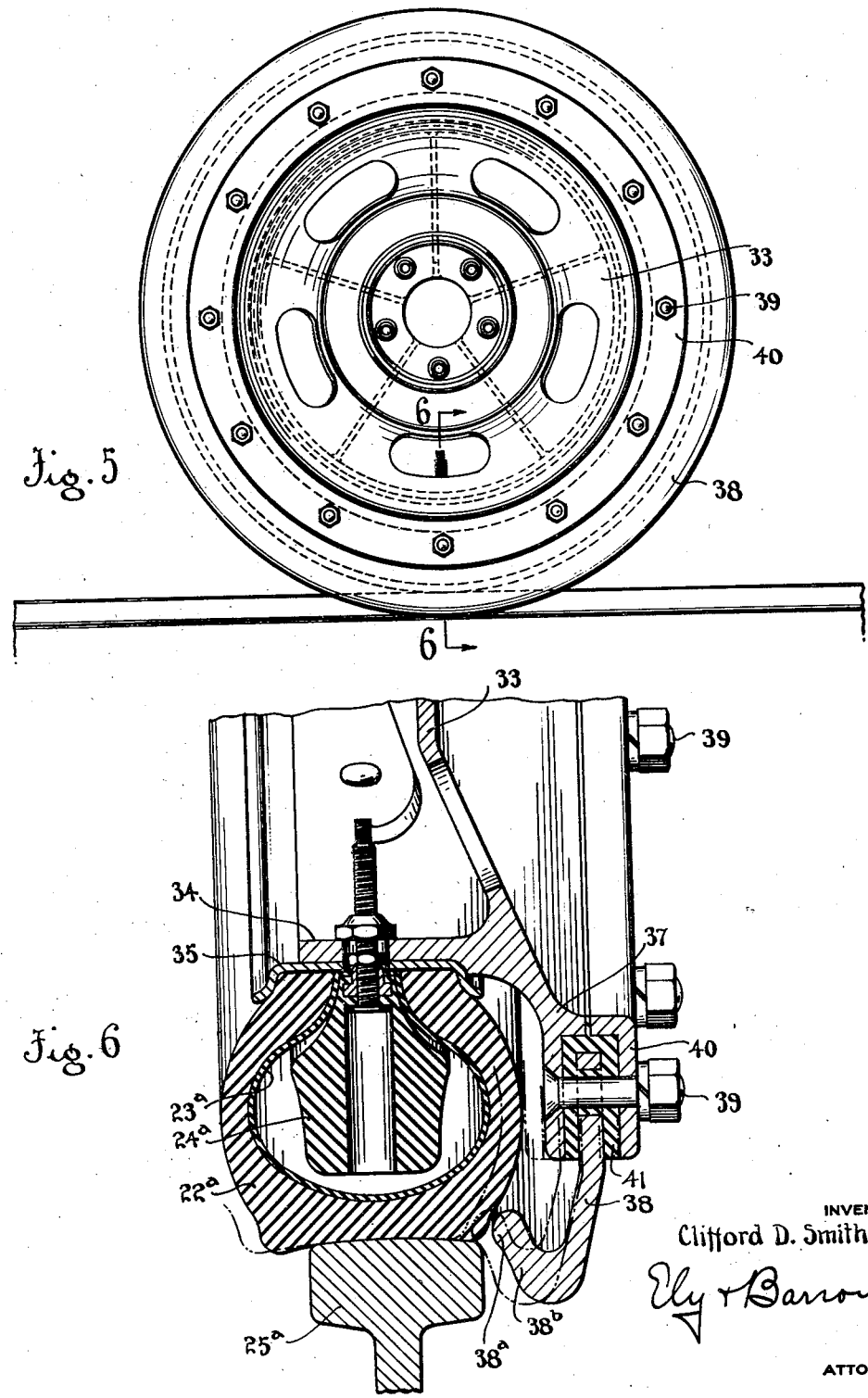

Patented Jan. 21, 1936

2,028,707

UNITED STATES PATENT OFFICE 2,028,707

WHEEL FOR RAIL CARS

Clifford D. Smith, Fairlawn, Ohio, assignor to The Firestone Tire & Rubber Company, Akron, Ohio, a corporation of Ohio Application April 25, 1932, Serial No. 607,338

4 Claims. (Cl. 295—7)

This invention relates to wheels for rail cars, and more especially it relates to rail car wheels that are equipped with pneumatic tires. The invention resides in the feature of improved rail-engaging lateral flanges on wheels of the character mentioned.

The chief objects of the invention are to provide an improved flange for use on car wheels employing pneumatic tires, which flange will function perfectly under all conditions of load and tire inflation; to provide a flange of the character mentioned which will not transmit shock or vibration to the wheel and to the vehicle; and to provide such a flange which will function noiselessly. Other objects will be manifest in the following specification.

Of the accompanying drawings:

Figure 1 is a fragmentary front elevation of a car wheel embodying the invention;

Figure 2 is a section on the line 2—2 of Figure 1, showing the relative position of the wheel flange and a track rail under condition of minimum load;

Figure 3 is a fragmentary section similar to Figure 2 showing the relative position of the parts under maximum load;

Figure 4 is a fragmentary section through another embodiment of the invention;

Figure 5 is a rear elevation of a car wheel embodying the invention in still another form; and Figure 6 is a section on the line 6—6 of Figure 5.

Referring to the drawings, 10 is a vehicle wheel which may be mounted upon a suitable hub by means of bolts passing through the bolt-holes 11. The wheel 10 is formed with a peripheral rim or felly 12 upon which is mounted a demountable tire rim 13 that is retained in place by a circumferential series of threaded studs 14 upon which are respective nuts 15. On its inner lateral margin the tire rim 13 is formed with an integral tire-bead-engaging flange 16, and on its outer lateral marginal portion it carries a removable bead-engaging flange 17 that is secured to the rim structure 13 by means of a series of threaded studs 18 and nuts 19. The flange 17 is formed with apertures 20 coincident with the respective studs 14 and nuts 15, whereby the latter can be removed to permit the demounting of the rim 13 without removing the flange 17 therefrom.

Mounted upon the tire rim 13 is a pneumatic tire 22 including an inner tube 23, and preferably including an annular cushion member 24 of solid rubber of somewhat smaller size than the interior of the tire 22, and so arranged in the latter as determinately to limit the deflection of the tire under heavy loads, and to provide support for the wheel in the event that the tire is deflated from puncture or other cause. The tread of the tire 22 is suitably shaped to fit upon the rail head 25 of a standard track rail.

If desired the cushion member 24 and tire 22 may be so proportioned and the inflation of the tire may be such, that when the tire is at rest the cushion engages the inner surface of the tread of the tire as shown in Figure 3, and when the car is in motion the centrifugal force and resistance to flexing causes the inner surface of the tread of the tire to be spaced away from the cushion 24 as shown in Figure 2.

The improved wheel flange comprises an annular integral extension 27 of the bead-engaging flange 16, said extension 27 being substantially spaced from the side of the tire, and being of larger outside diameter than the tire so as to extend to the side of the rail head 25. Between the extension 27 and the rail head is a wear plate 28 adapted, upon occasion, to bear against the rail head, said plate 28 being attached to the extension 27 by an interposed cushion layer 29 of rubber that is vulcanized to both of said members and constitutes their sole connecting medium. Those faces of the members 27, 28, to which the rubber is attached preferably are serrated as shown, to provide greater attaching area for the rubber.

That portion of the wear plate 28 that sometimes bears against the rail head is reversely curved in section, there being a convex portion 28$^a$, and a slightly concave portion 28$^b$ radially outwardly thereof, said concave portion having a larger radius than the radius of the adjacent corner of the rail head 25. It will be apparent from Figures 2 and 3 that when the wheel flange engages the rail head it will be portions 28$^a$ or 28$^b$ that make contact therewith, depending upon whether the vehicle is loaded or light. Because of the arcuate contour of the wear plate 28, the latter can make only line contact with the rail head, with the result that there is no sliding of metal on metal and consequently there is no squeaking or other noise. Moreover, the feature of line contact between the members and lack of sliding friction therebetween reduces wear on the members. The presence of the rubber cushion 29 between the members 27, 28 of the wheel flange prevents transmission of vibration from the wear plate 28 to the member 27 and thus to the wheel, and deadens any sound set up by the engagement of the wear plate with the rail head, whereby quietness of operation is assured.

The embodiment of the invention shown in Figure 4 is identical with that previously described except that a circumferential cushion of rubber 30 is mounted in the wear plate in the region thereof that makes contact with the rail head. This structure is absolutely noiseless in operation, although probably it is not as durable as the other embodiments.

In the embodiment of the invention shown in Figures 5 and 6, a metal disc wheel 33 has a concentric annular flange 34 extending laterally from its front side, and mounted upon said flange is a collapsible tire rim 35 which may be retained upon said flange in any suitable manner. Mounted upon tire rim 35 is a pneumatic tire 22a, inner tube 23a, and cushion member 24a, which may be identical with similar members shown in the other embodiments of the invention. The tire is shown as it appears when the vehicle is loaded, and is shown resting upon a standard rail head 25a.

The wheel 33 is formed with an integral radial flange 37 that extends behind the tire 22a, and supports an annular, rail-engaging flange 38 that is substantially J-shape in section. The flange 38 is secured to the flange 37 by means of a circumferential series of bolts 39, and an annular clamping plate 40, the flange 38 being disposed between the flange 37 and clamping plate 40. That portion of the flange 38 that is so clamped has a cushion of resilient rubber composition 41 vulcanized to both faces, said rubber covering the inner peripheral margin of the flange and also lining the holes that receive the bolts 39. The arrangement is such that flange 38 is completely insulated from the wheel 33 whereby no vibration is transmitted to the latter from the flange. The bolts 39 may be tightened as the rubber 41 ages so that the flange 38 always is firmly yet resiliently supported.

The reversely curved portion of the flange 38, which is the portion that engages the rail head 25a is formed with a convex portion 38a and contiguous concave portion 38b that are similar to and serve the same purpose as portions 28a, 28b of the other embodiments of the invention. The invention as shown in Figures 5 and 6 functions in the same manner as the other embodiments, but has the added advantage that the rail-engaging flange 38 may be mounted on or dismounted from the wheel without removing the tire therefrom. Also the vulcanizing of the rubber cushion 40 on the rail flange 38 is a much simpler matter than the vulcanizing of the rubber cushion 29 on the rail flange 27 which comprises the tire rim 13.

Other modifications may be resorted to without departing from the spirit of the invention, or the scope of the appended claims which are not limited wholly to the specific construction shown and described.

What is claimed is:

1. A wheel for rail cars comprising a resilient tire, and a wheel flange at one side thereof, said wheel flange having a rail-engaging portion that is reversely curved in transverse section and terminates radially at the periphery of said wheel flange, and an interposed cushion of resilient rubber composition serving as the sole means for connecting said rail-engaging portion to said wheel flange.

2. A wheel for rail cars comprising a resilient tire, an annular wheel flange at one side thereof, an annular rail-engaging member having its rail-engaging face formed with a convex portion which is adapted to make line contact with a rail head, said convex portion being disposed radially inwardly of the periphery of said wheel flange and closer to the central plane of the tire than said periphery, a cushion of resilient rubber vulcanized between said rail-engaging member and said wheel flange and serving to connect said member and said flange by a vulcanized rubber bond.

3. A wheel for rail cars comprising a resilient tire, an annular wheel flange at one side thereof, an annular rail-engaging member concentrically disposed about said annular wheel flange, and a cushion of resilient rubber vulcanized between the rail-engaging member and the annular wheel flange for maintaining said member and flange in assembled condition by a vulcanized adhesive bond, said rail-engaging member and said annular wheel flange having contiguous portions extending entirely to the outer periphery of the wheel.

4. A wheel for rail cars comprising a resilient tire, an annular wheel flange at one side thereof having a pair of peripheral portions, an annular rail-engaging member concentrically disposed about said annular wheel flange, and a cushion of resilient rubber vulcanized to the inner peripheral portion of said rail-engaging member, and means for mounting the inner peripheral portion of the rail-engaging member between the outer peripheral portions of the wheel flange to place said rubber cushion under initial compression.

CLIFFORD D. SMITH.